US 8,953,506 B2

(12) United States Patent
Sohrabi

(10) Patent No.: US 8,953,506 B2
(45) Date of Patent: Feb. 10, 2015

(54) TIME MULTIPLEXING FOR COEXISTENCE WITHIN MULTIPLE COMMUNICATION SYSTEMS

(71) Applicant: Wi-LAN, Inc., Ottawa (CA)

(72) Inventor: Katayoun Sohrabi, San Diego, CA (US)

(73) Assignee: Wi-LAN, Inc., Ottawa, ON (CA)

( * ) Notice: Subject to any disclaimer, the term of this patent is extended or adjusted under 35 U.S.C. 154(b) by 0 days.

(21) Appl. No.: 13/668,832

(22) Filed: Nov. 5, 2012

(65) Prior Publication Data

US 2013/0064155 A1    Mar. 14, 2013

Related U.S. Application Data

(63) Continuation of application No. 12/130,902, filed on May 30, 2008, now Pat. No. 8,315,234.

(60) Provisional application No. 60/974,822, filed on Sep. 24, 2007, provisional application No. 61/027,402, filed on Feb. 8, 2008.

(51) Int. Cl.
  *H04B 3/20*  (2006.01)
  *H04W 72/12*  (2009.01)
  (Continued)

(52) U.S. Cl.
  CPC .... *H04W 72/1242* (2013.01); *H04J 2203/0069* (2013.01); *H04L 29/08477* (2013.01);
  (Continued)

(58) Field of Classification Search
  CPC ............. H04J 2203/0067; H04J 2203/0069; H04L 5/0055; H04L 29/08477
  USPC .......... 370/287, 341, 459, 330, 282, 277
  See application file for complete search history.

(56) References Cited

U.S. PATENT DOCUMENTS 5,825,763 A    10/1998  Kato et al.
6,526,034 B1 *  2/2003  Gorsuch ................ 370/338
(Continued)

FOREIGN PATENT DOCUMENTS

EP    1 411 691       4/2004
EP    1411691 A2     4/2004

OTHER PUBLICATIONS

"Summary of IEEE 802.15.2 WLAN/WPAN Coexistence Mechanisms; 01482r0P802-15_TG2-Summary-Coexistence-Mechanisms," IEEE Draft, pp. 1-22 (Nov. 2001).
(Continued)

*Primary Examiner* — Ricky Ngo
*Assistant Examiner* — Dewanda Samuel
(74) *Attorney, Agent, or Firm* — Volpe & Koenig, P.C.

(57) ABSTRACT

Methods and apparatus permitting the coexistence of multiple communication links to distinct wireless systems in a client device are disclosed. A wireless device can interface with both a primary communications system and at least one distinct communications system by managing the coexistence of active communications with the multiple communication systems. The wireless device can initially configure communications with the primary communications system for dynamically reconfigurable time multiplexed operation having scheduled periods of inactivity. The wireless device can determine timing and scheduling of communications with the distinct communications systems and can schedule the communications with the distinct communications systems during periods of inactivity in the primary communications system. The periods of inactivity may be limited to the scheduled periods of inactivity or can include unscheduled periods of inactivity occurring during active periods of the time multiplexed operation. The device may also use data priorities of communications to override overlapping communication activity.

7 Claims, 9 Drawing Sheets

(51) Int. Cl.
*H04L 29/08* (2006.01)
*H04L 5/00* (2006.01)
*H04W 88/06* (2009.01)

(52) U.S. Cl.
CPC ....... *H04L5/0055* (2013.01); *H04J 2203/0067* (2013.01); *H04W 72/1215* (2013.01); *H04W 88/06* (2013.01)
USPC .......... 370/287; 370/341; 370/459; 370/330; 370/282; 370/277

(56) References Cited

U.S. PATENT DOCUMENTS

| | | | |
|---|---|---|---|
| 6,600,726 B1 * | 7/2003 | Nevo et al. | 370/278 |
| 6,978,121 B1 | 12/2005 | Lane et al. | |
| 7,363,051 B2 * | 4/2008 | Bridgelall | 455/553.1 |
| 7,542,728 B2 * | 6/2009 | Bitran et al. | 455/73 |
| 7,643,463 B1 | 1/2010 | Linsky et al. | |
| 7,664,532 B2 | 2/2010 | Palin et al. | |
| 7,725,118 B2 | 5/2010 | Yang et al. | |
| 7,843,870 B2 * | 11/2010 | Olfat | 370/328 |
| 7,929,432 B2 | 4/2011 | Zhu et al. | |
| 8,094,631 B2 * | 1/2012 | Banerjea et al. | 370/338 |
| 2006/0133334 A1 | 6/2006 | Ross | |
| 2006/0292987 A1 | 12/2006 | Ophir et al. | |
| 2007/0066314 A1 * | 3/2007 | Sherman et al. | 455/445 |
| 2007/0099567 A1 | 5/2007 | Chen et al. | |
| 2007/0135162 A1 | 6/2007 | Banerjea et al. | |
| 2007/0183383 A1 | 8/2007 | Bitran et al. | |
| 2007/0232358 A1 | 10/2007 | Sherman | |
| 2007/0275746 A1 | 11/2007 | Bitran | |
| 2008/0051085 A1 * | 2/2008 | Ganton | 455/435.2 |
| 2008/0161031 A1 * | 7/2008 | Tu | 455/512 |
| 2008/0247367 A1 | 10/2008 | Guo et al. | |
| 2009/0147736 A1 * | 6/2009 | Chen et al. | 370/329 |
| 2010/0088332 A1 * | 4/2010 | Nussel et al. | 707/759 |
| 2011/0235621 A1 * | 9/2011 | Ko et al. | 370/338 |

OTHER PUBLICATIONS

"Tutorial on 802.15.2 Draft; 02138r0P802-15_TG2-Tutorial-on-TG2-Draft," IEEE Draft, pp. 1-29 (Mar. 2002).

Phillips, How 802.11 b/g WLAN and Bluetooth Can Play, pp. 1-5 (2003).

Zhu et al., "Multi-Radio Co-existence: Challenges and Opportunities," Proceedings of the 16$^{th}$ International Conference on Computer Communications and Networks, pp. 358-364 (Aug. 2007).

* cited by examiner

TIME MULTIPLEXING FOR COEXISTENCE WITHIN MULTIPLE COMMUNICATION SYSTEMS

CROSS REFERENCE TO RELATED APPLICATIONS

This application is a continuation of U.S. non-provisional application Ser. No. 12/130,902, filed May 30, 2008, which claims the benefit of U.S. Provisional Application No. 60/974,822, filed Sep. 24, 2007, and claims the benefit of U.S. Provisional Application No. 61/027,402, filed Feb. 8, 2008, which are incorporated by reference as if fully set forth.

FIELD OF THE INVENTION

The present disclosure relates to the field of wireless communications. More particularly, the present disclosure relates to time multiplexing communications to permit concurrent coexistence of active wireless communication links with multiple distinct wireless communication systems.

BACKGROUND

Related Art

Advances in processing capabilities permit increasingly complex operations to be performed in low cost consumer devices. Additionally, advances in wireless communication technologies ease implementing communication links as wireless links.

Mobile communication devices may permit concurrent support of multiple wireless communication links, with each communication link operating in a distinct communication system according to a corresponding communication standard. The mobile communication device can utilize the multiple concurrent communication links to support multiple concurrent applications or to support a single application.

For example, a mobile communication device may concurrently download a data file using a first communication link within a first wireless communication system and engage in voice communication using a second wireless communication link within a second distinct communication system. Alternatively, a mobile communication device may support voice communications over a wireless communication link and may relay the local voice and audio to a headset using a distinct wireless communication link.

The mobile communication device configured to support the multiple communication systems needs to ensure that configuring the device to support a particular communication standard within a communication system does not adversely affect users of other communication systems. Minimizing interference and maintaining quality communications can be particularly difficult where the mobile communication device concurrently supports multiple active communication links. The problem of maintaining signal quality while minimizing interference is made even more difficult where the multiple communication systems operate in adjacent wireless spectrum and without awareness of one other.

SUMMARY

Methods and apparatus permitting the coexistence of multiple communication links to distinct wireless systems in a client device are disclosed. A wireless device can interface with both a primary communications system and at least one distinct communications system by managing the coexistence of active communications with the multiple communication systems. The wireless device can initially configure communications with the primary communications system for dynamically reconfigurable time multiplexed operation having scheduled periods of inactivity. The wireless device can determine timing and scheduling of communications with the distinct communications systems and can schedule the communications with the distinct communications systems during periods of inactivity in the primary communications system. The periods of inactivity may be limited to the scheduled periods of inactivity or can include unscheduled periods of inactivity occurring during active periods of the time multiplexed operation. The device may also use data priorities of communications to override overlapping communication activity.

Aspects of the present disclosure include a method of coexistence of multiple communication links in distinct wireless systems. The method includes configuring a primary communication system for dynamically reconfigurable time multiplexed periods of scheduled inactivity, determining activity of at least one distinct communication system, determining an indication of inactivity in the primary communication system, and arbitrating the activity of the primary communication system and the activity of the at least one distinct communication system to permit communications with the at least one distinct communication system based on the indication of inactivity.

Aspects of the present disclosure include a method of coexistence of multiple communication links in distinct wireless systems. The method includes configuring a first subsystem of a wireless communication device for scheduled periods of inactivity, determining an activity state associated with a scheduled communications based on a Personal Area Network (PAN) subsystem of the wireless communication device, determining whether the activity state occurs during a period of inactivity for the first subsystem, and enabling communications in the PAN subsystem if the activity state occurs within the period of inactivity.

Aspects of the present disclosure include an apparatus configured for coexistence of multiple communication links in distinct wireless systems. The apparatus includes a first communication subsystem configured to establish dynamically reconfigurable time multiplexed communications with a first wireless system having a first time reference, a second communication subsystem configured to establish communications with a second wireless system having a second time reference independent of the first time reference, a coexistence block configured to arbitrate access by the first communication subsystem and the second communication subsystem based on activity of each of the first communication subsystem and the second communication subsystem, and a host processor configured to control at least a portion of operations of each of the first and second communication subsystem and configured to selectively enable the second subsystem based on access arbitration by the coexistence block.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE PREFERRED EMBODIMENTS

Figure 1:
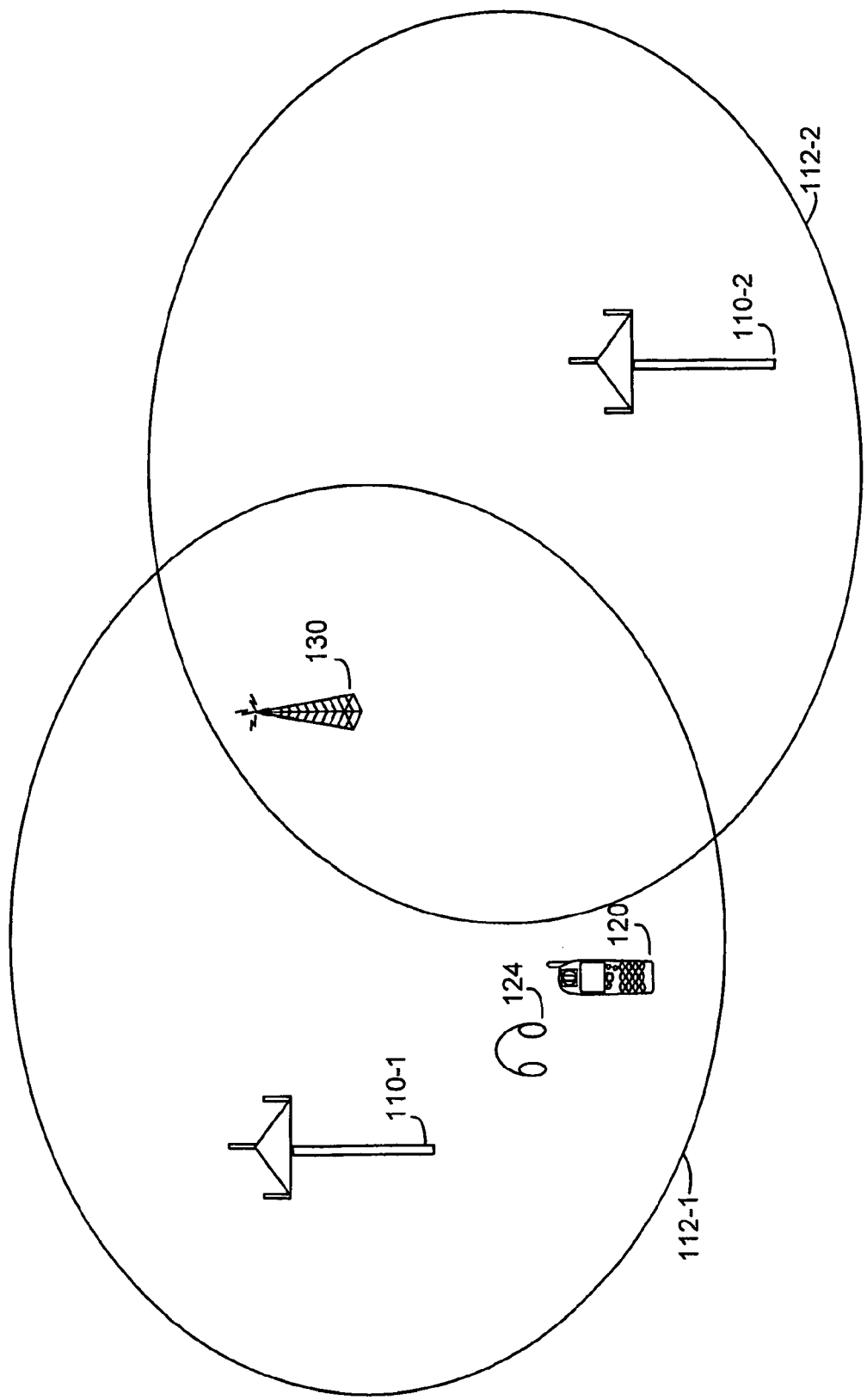
FIG. 1 is a simplified system diagram of a mobile device operating in an environment supported by multiple communication systems.

In accordance with an embodiment, a wireless device, such as a mobile communication device, can support coexistence of multiple active communication links by intelligently time division multiplexing the communications with each communication link in a manner that has substantially little or no effect on the ability to communicate information over each of the links.

In accordance with an embodiment, a wireless device may support coexistence of multiple active communication devices by performing the method of determining timing of a primary communication system, determining timing of at least one distinct communication system, determining a period of inactivity in the primary communication system, and scheduling communications with the at least one distinct communication system during the period of inactivity.

In accordance with an embodiment, a wireless device supporting coexistence of multiple active communication devices can include a first communication subsystem configured to establish communications with a first wireless system having a first time reference, a second communication subsystem configured to establish communications with a second wireless system having a second time reference independent of the first time reference, and a host processor configured to control at least a portion of operations of each of the first and second communication subsystem and configured to selectively enable the second subsystem during periods of inactivity of the first communication subsystem.

The methods and apparatus described herein are generally directed to coexistence of WiMax communications such as those in accordance with IEEE 802.16, with Personal Area Network (PAN) communications such as those in accordance with the Bluetooth communication standard, or with wireless Local Area Network (WLAN) communications such as those in accordance with IEEE 802.11. However, the methods and apparatus are typically not limited to use in these specific wireless systems, but are applicable across a wide range of wireless communication technologies. For example, the methods and apparatus described herein are also applicable to Long Term Evolution (LTE) and Bluetooth coexistence in implementations where LTE operations use a downlink or uplink frequency band that may result in interference with Bluetooth operations and where in using such potentially interfering band, there are schedule periods of inactivity (similar to power saving class in WiMax) for the mobile device at the potentially interfering band. The methods and apparatus described herein are described in the context of implementation within a mobile device. However, implementation within a mobile device is not a limitation, and the methods and apparatus are also applicable to supporting coexistence in non-mobile devices, and non-client devices. For example, the device may be a notebook computer, handheld computer, desktop computer, television set top box, gaming device, cellular telephone, portable music player, and the like or some combination thereof.

A wireless device can be configured to support coexistence between WiMax and PAN wireless communications by configuring the WiMax communication link as a primary communication link, and implementing time division multiplexed communications in the primary communication link. The wireless device can track the timing associated with PAN communications, and can selectively enable the PAN communications during idle or otherwise inactive periods of the WiMax communications.

For example, in an embodiment, a client device, such as a wireless mobile device, supports concurrent active Bluetooth and WiMax communications in which Bluetooth and WiMax transmissions are coordinated in the client device in order to reduce interference. In another embodiment, a client device supports both WiFi (IEEE 802.11) and WiMax communications, where the WiFi and WiMax communications are coordinated to reduce interference. Pursuant to these embodiments, Bluetooth and/or WiFi transmissions can be scheduled during WiMax sleep periods (e.g., time periods in which no WiMax frame is scheduled for transmission to/from the client device) or during periods of time in which neither uplink nor downlink resources are allocated to the client device in support of WiMax communications. In a system employing a separate WiMax baseband processor and Bluetooth baseband processor (and/or WiFi processor), information regarding when the Bluetooth processor (or WiFi processor) may schedule Bluetooth transmissions (or WiFi transmissions) may be communicated to the Bluetooth baseband processor (or WiFi processor) from the WiMax baseband processor via a coexistence interface.

As an example, the wireless device can be configured to negotiate a Power Saving Class (PSC) mode with the one or more base stations supporting the active WiMax communications. Typically, the PSC modes are dynamically reconfigurable time division multiplex modes having scheduled periods of inactivity. Operating in a PSC mode enables a wireless device to transition to a sleep or otherwise inactive mode during the scheduled period of inactivity in order to conserve battery power. The PSC modes can selectively identify a wireless device as available or unavailable in increments of a WiMax frame. However, rather than transitioning to the sleep mode, the wireless device may schedule activity on concurrent active communications with distinct communication systems during periods of inactivity.

The wireless device can be configured to negotiate a PSC mode that periodically identifies the wireless device as unavailable or otherwise inactive. The wireless device can be configured to dynamically negotiate a duty cycle that is sufficient to support its active communication link. The wireless device can be configured to enable communications with the PAN on the one or more frames for which WiMax communications are unavailable as a result of the PSC mode negotiated with the serving base station or as a result of the wireless device having no data and no resource allocations during a period of inactivity.

Alternatively, the wireless device need not negotiate a PSC mode with a serving base station in order to support WiMax and PAN coexistence. Instead, the wireless device may determine which WiMax frames have no Uplink (UL) or Downlink (DL) resource allocations for the wireless device. The wireless device can communicate over the PAN during frames for which no UL or DL resources are allocated to the wireless device. Alternatively, the wireless device can be configured to communicate over the PAN during portions of the WiMax frames for which no downlink (DL), Uplink (UL), or combination of DL and UL resources are scheduled for the wireless device. This embodiment may be particularly advantageous for wireless devices operating in a receive-only mode or otherwise unable to negotiate a PSC mode with a serving base station.

In yet another embodiment, a wireless device may negotiate a PSC mode, but not limit coexistence with other distinct wireless communications systems to the scheduled periods of inactivity. The wireless device may schedule or otherwise enable communications with one or more distinct wireless communications systems, such as the PAN, during periods in which the wireless device is inactive with respect to the WiMax communication system. The periods of WiMax inactivity include the scheduled periods of inactivity due to the PSC mode as well as periods of WiMax inactivity due to a lack of resource allocations, which may occur more randomly or more intermittently. The use of the PSC mode ensures that the wireless device is not dedicated to the active WiMax communication, but rather, includes some periods of time for which the wireless device is inactive with respect to the WiMax system.

FIG. 1 is a simplified system diagram of a mobile device 120 operating in an environment supported by multiple communication systems. The mobile device 120 can be within a coverage area of a first communication system, such as a WiMax communication system substantially in accordance with IEEE 802.16. It should be noted that although FIG. 1 is discussed with reference to mobile device 120, in other embodiments other types of client devices may be used, such as, for example, client devices that need not be mobile.

A first base station 110-1 can support communications with devices within an associated first coverage area 112-1. Similarly, a second base station 110-2 can support communications over a corresponding second coverage area 112-2. Each base station 110 can be configured to support multiple access communications with mobile devices 120 within its respective coverage area 112.

Additionally, the base stations 110 may be configured to provide broadcast services, and may broadcast synchronized data over the coverage areas 112. For example, the base stations 110 can be configured to support television type of broadcast data and may synchronize the broadcast data. Support of synchronized broadcast data across multiple base station coverage areas utilizing multiple base stations may be referred to as macro-diversity signals. The macro-diversity signals may be transmitted during predetermined portions, referred to as macro-diversity regions or macro-diversity zones, of the downlink frames. For example, in a network supporting WiMax (IEEE 802.16), the base stations 110 may broadcast media (e.g., television channels) using an Multicast and Broadcast Service (MBS) region of a WiMax data frame (also referred to as a WiMax Orthogonal Frequency Division Multiplex Access (OFDMA) Frame), where the MBS regions transmitted by multiple base stations 110 are synchronized.

A wireless access point 130 may support communications with a Wireless Local Area network (WLAN) such as a WLAN in accordance with IEEE 802.11, which is commonly referred to as WiFi. The WLAN access point 130 may provide access to the WLAN for devices within its coverage area (not shown).

A mobile device 120 can be in the coverage area 112-1 of the first base station 110-1 and may selectively establish communications with the corresponding communication system via base station 110-1. The mobile device 120 may also be within the coverage area of the WLAN access point 130 and may selectively access and communicate over the WLAN.

The mobile device 120 may also have the ability to communicate with a Personal Area Network (PAN) device 124, such as a Bluetooth enabled headset. The mobile device 120 may selectively engage in communications over the PAN with the PAN device 124.

In some instances, the mobile device 120 may wish to establish concurrent communications with more than one wireless communication system. In a typical application, the mobile device 120 may engage in a telephone communication over the WiMax system using the first base station 110-1. The mobile device 120 may concurrently establish a communication link with the PAN device 124 to enable a wireless link carrying audio to and from a wireless Bluetooth headset.

In another embodiment, the mobile device can be configured to selectively tune to content in a broadcast region of data transmitted in the WiMax system (e.g. a macro-diversity region or MBS region of a WiMax OFDMA frame). The mobile device 120 may not need to register or otherwise communicate with a base station 110 in order to receive such broadcasts. The mobile device 120 may establish a concurrent active wireless communication link with the PAN device 124, for example, to transmit audio to a Bluetooth headset.

In each of the embodiments described above, the mobile device 120 concurrently establishes and communicates over multiple active communication links with multiple communication systems. The mobile device 120 may engage in a coexistence process in order to ensure that each communication link does not interfere with another communication link.

As an example, WiMax systems may be configured to operate in the bands of approximately 2.3-2.39 GHz (Wireless Communications Services band) or 2.5-2.6 GHz (Instructional Fixed Television Services band) and 2.6-2.69 GHz (Multichannel Multipoint Distribution Services band). A wireless PAN system, such as Bluetooth, or a WLAN system, such as WiFi, are typically configured to operate in an unlicensed Instrumentation, Scientific, and Medical (ISM) band of approximately 2.4-2.485 GHz. As can be seen, the WiMax and ISM bands are in close spectral proximity. The mobile device 120 has limited ability to implement a filter that substantially isolates signals from one communication system to another.

The mobile device 120 can be configured to implement some system constraints into a coexistence process that enables coexistence of multiple communications over multiple communications systems. For example, transmit interference from a system may severely impact the ability to receive signals in another system. Thus, the coexistence process may establish a constraint limiting transmission during an active receive period. For example, the mobile device 120 may be constrained to not transmit WiMax signals during Bluetooth reception. Similarly, the mobile device 120 may be constrained to not transmit Bluetooth during WiMax receive periods.

One manner of satisfying the coexistence constraints is through time multiplexing of the various communications. The mobile device 120 can time multiplex communications such that it is engaged in only one communication link at any instant of time, regardless of the total number of active wireless communication links in which it is a participant.

However, the ability of the coexistence process within the mobile device 120 to time multiplex the various communications is limited by the distinct time bases and time references utilized in the various communication systems. The time base and time reference of a WiMax system is typically independent of and/or unaware of a time base and time reference for other communication systems. Indeed, it would be difficult for the WiMax system to monitor and track the timing of signals in an unlicensed communication band, in which, by definition, any number of unlicensed wireless devices and systems may be present.

In an embodiment, the coexistence process within the mobile device 120 does not attempt to synchronize the timing of the various systems. Instead, the mobile device 120 determines timing for a primary communication system, such as the WiMax system. The mobile device 120 then establishes or otherwise monitors the timing of each of the other concurrently active distinct communication systems. The mobile device 120 uses the time awareness to selectively schedule the communications with the wireless systems during idle or otherwise inactive periods of the primary communication system.

Figure 2:
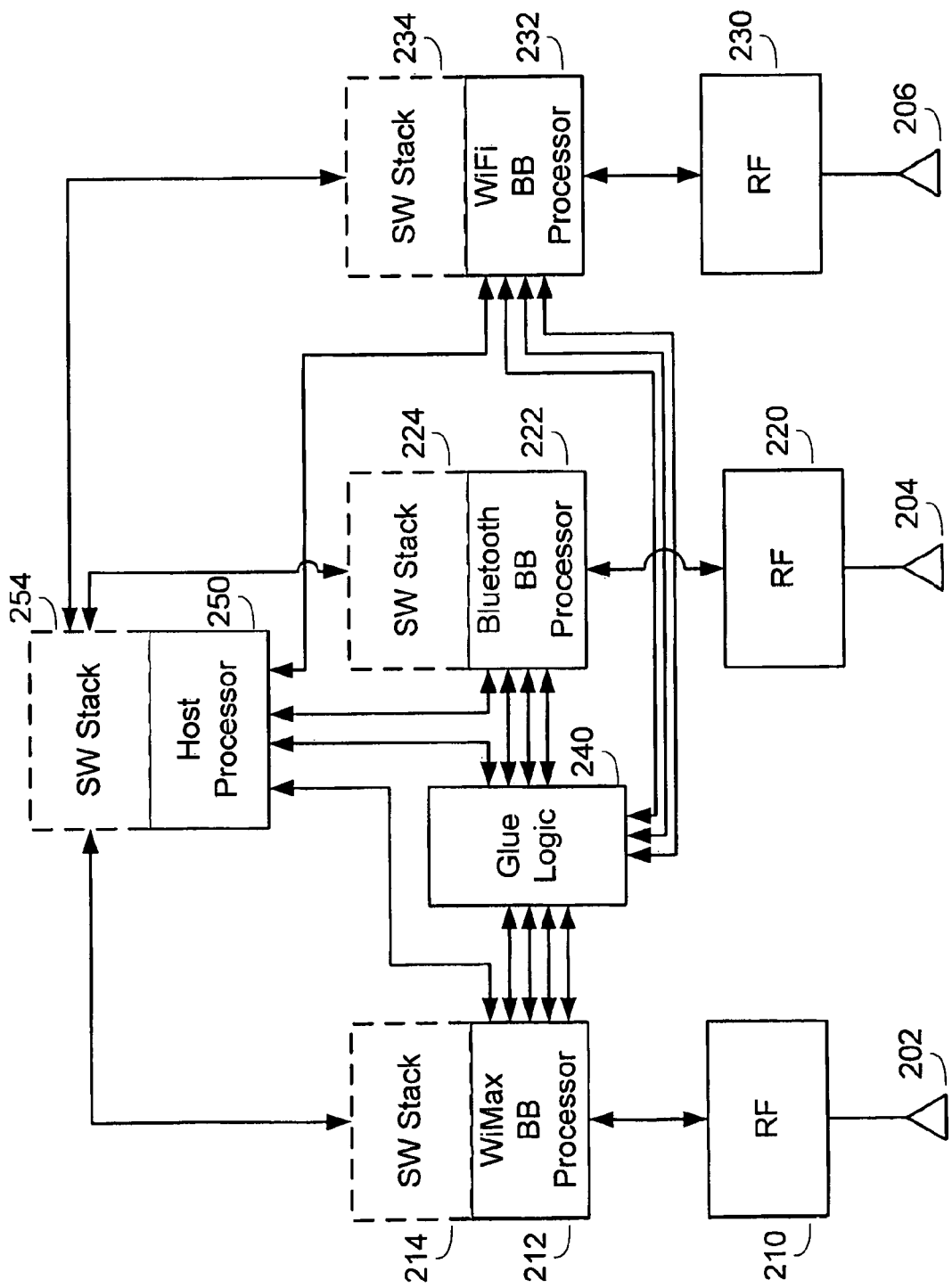
FIG. 2 is a simplified functional block diagram of an embodiment of a mobile device.

FIG. 2 is a simplified functional block diagram of an embodiment of a mobile device 120. The mobile device 120 can be, for example, the mobile device of FIG. 1 and can be configured to implement multiple wireless system coexistence. The mobile device 120 can be configured as a multiple system wireless device, and can be configured to support wireless communications over a WiMax system, a PAN system such as a Bluetooth system, and a WLAN system such as a WiFi system.

Each of a WiMax subsystem, a Bluetooth subsystem, and a WiFi subsystem is similarly configured with an antenna, RF section, and a baseband processor. Each subsystem is shown as a distinct subsystem for the sake of clarity. The mobile device 120 may implement one or more of the subsystems using common modules.

The WiMax subsystem includes an antenna 202 coupled to a WiMax RF section 210. The WiMax RF section 210 is coupled to a WiMax baseband processor 212. The WiMax baseband processor 212 may be configured to operate according to one or more processor readable instructions stored in a storage device, such as memory. The WiMax baseband processor 212 may execute the instructions from memory in order to perform some or all of the WiMax baseband processing functions. The WiMax baseband processing tasks are functionally illustrated as a software stack 214 running on top of the WiMax baseband processor 212.

The Bluetooth subsystem includes an antenna 204 coupled to a Bluetooth RF section 220. The Bluetooth RF section 220 is coupled to a Bluetooth baseband processor 222. The Bluetooth baseband processing tasks are functionally illustrated as a software stack 224 running on top of the Bluetooth baseband processor 222.

Similarly, the WiFi subsystem includes an antenna 206 coupled to a WiFi RF section 230. The WiFi RF section 230 is coupled to a WiFi baseband processor 232. The WiFi baseband processing tasks are functionally illustrated as a software stack 234 running on top of the WiFi baseband processor 232.

Each subsystem may operate under the control of, or in association with, a host processor 250. The host processor 250 may be configured to operate according to one or more processor readable instructions stored in memory. The host processor 250 may execute the instructions from memory in order to perform some or all of the host control functions. The host software tasks are functionally illustrated as a software stack 254 running on top of the host processor 250.

Although FIG. 2 illustrates distinct software processes in the host processor 250 and each of the baseband processors 212, 222, and 232, portions of or all of the various software processes illustrated in the software stacks 214, 224, 234 and 254 may be executed by a different processor than the one shown in the figure or by a combination of processors. For example, the host processor 250 software stack 254 may be executed by the WiMax baseband processor 212, or portions or all of the software stack 214, 224, or 234 for each of the baseband processors 212, 222, and 232 may be executed by the host processor 250.

The Bluetooth baseband processor 222 and the WiMax baseband processor 212 may implement hardware interfaces that facilitate coexistence. For example, the Bluetooth baseband processor 222 can be configured to support a 3-wire interface such as the interface described in IEEE 802.15.2 recommended practices. The 3-wire interface can be configured, for example, to control whether the corresponding baseband processor is active, inactive, and whether the Power Amplifier or the RF section in general is enabled or shut down. Alternatively, the Bluetooth baseband processor 222 can be configured to support some other type of interface, and the interface can be a recommended interface, an extension of a recommended interface, or a custom interface. The interface can also convey information about the priority level of operation for each transmission/reception activity of the mobile device.

The 3-wire interface of the Bluetooth baseband processor 222 can be coupled to a similar control interface of the WiMax baseband processor 212 via glue logic 240. The host processor 250 can also be configured to control one or more lines of the control interface in each of the baseband processors, and may be configured to control portions of the glue logic 240. Glue logic 240 may comprise software executed by one or more of the baseband processors (212, 222, and/or 232), host processor 250, a separate processor, a combination thereof. Alternatively or additionally, glue logic 240 may comprise separate hardware that performs the glue logic functions or operates in conjunction with the software to perform the glue logic functions.

The glue logic 240 can be used, for example, to configure or otherwise augment the signals of one control interface to be used by another control interface. For example, the WiMax baseband processor can be configured to support the standard 3-wire interface but may also be configured to communicate additional information to the Bluetooth baseband processor 222. Such additional information may include, for example, an enable signal, a duration of an interval over which the Bluetooth communication may be active, or some other information.

The glue logic 240 may translate the information from one processor to a form useable by another processor. For example, the Bluetooth baseband processor 222 may only support three control lines, and the glue logic may modulate additional information on one or more of the control lines.

The baseband processors, in conjunction with the host processor 250 may communicate idle or active periods to each of the baseband processors via the hardware control interfaces. The baseband processors may also utilize software to communicate the various conditions and states of each baseband processor (e.g., whether the baseband processor is either enabled or disabled and/or whether there is a current communication link supported by the baseband processor) along with control information regarding the communications links (e.g., control information that may be utilized by the baseband processor for scheduling transmissions). The interface can also be used to convey information about priority levels of operation of each transmission/reception activity by a baseband processor.

For example, the WiMax baseband processor 212 may communicate the WiMax frame timing to the host processor 250, and the host processor 250 may determine availability based on the frame timing information, PSC mode, and resource allocations for the WiMax subsystem, which may be communicated in one or more MAP messages of a downlink frame occurring during an active period of the PSC mode. The host processor 250 can be configured to determine the scheduling, for example, in a coexistence interface portion of the host processor software 254. The host processor 250 may schedule the communications using the various baseband processors, and may schedule the communications using hardware control, software control or a combination of hardware and software control.

For example, the host processor 250 may determine periods of availability within the WiMax communications for supporting Bluetooth communications. The host processor 250 can utilize Bluetooth timing information to determine which one or more slot numbers in the Bluetooth time reference in which Bluetooth communications may be enabled and scheduled. The host processor 250 and Bluetooth subsystem may configure the Bluetooth communications for any supported PAN mode. For example the Bluetooth subsystem may configure the Bluetooth communication for synchronous communications (SCO) or extended synchronous communications (eSCO), and is not typically limited to supporting any particular type of Bluetooth communications.

It may be advantageous for the mobile device 120 to configure the Bluetooth subsystem as the master Bluetooth device in order to have the ability to control the Bluetooth transmit timing. However, configuring the mobile device as the Bluetooth master is not a requirement. For example, the PSC mode virtually ensures that the Bluetooth subsystem will have periods in which the mobile device 120 is able to be configured to support Bluetooth communications.

Figure 3:
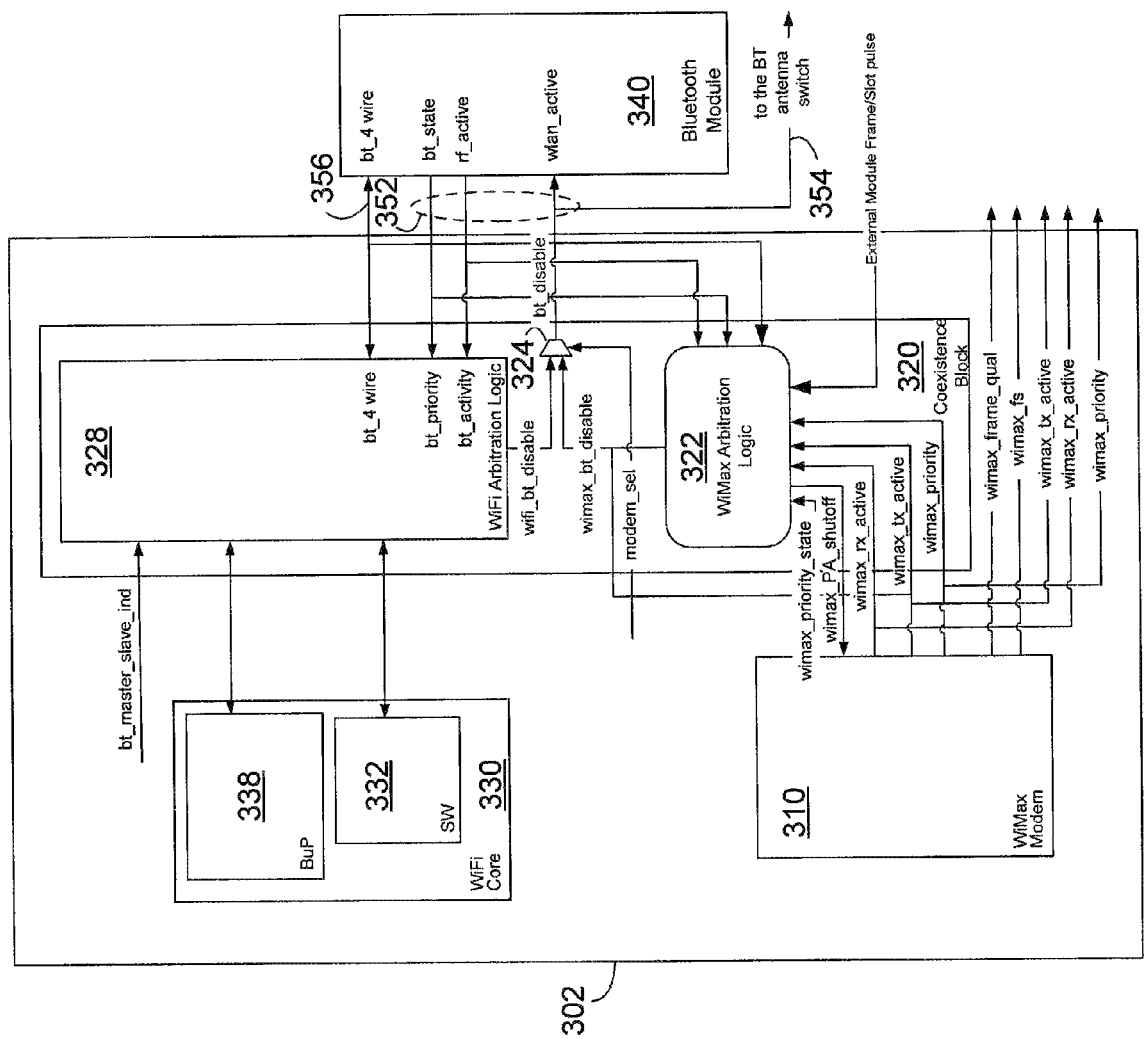
FIG. 3 is a simplified block diagram of an embodiment of baseband processors interfacing with a coexistence block.

FIG. 3 is a simplified block diagram of an embodiment of a baseband section 300 of a mobile device including baseband processors interfacing with a coexistence block. The baseband section 300 can be, for example, portions of the mobile device of FIG. 2 or a mobile device operating in the system of FIG. 1.

The baseband section 300 is configured as a multi-mode module 302 interfacing with a PAN module, illustrated in FIG. 3 as a Bluetooth module 340. The multi-mode module 302 and Bluetooth module 340 can each be implemented as an integrated circuit. The multi-mode module 302 can include a WiMax baseband processor 310, a WLAN baseband processor 330, and a coexistence block 320.

Each baseband processor in the multi-mode module 302 as well as the Bluetooth module 340 can include a processor and software stack. For example, the WLAN baseband processor 330 can be configured to support WiFi or some other WLAN standard. The WLAN baseband processor 330 can include a software stack 332 and a WLAN processor 338.

The coexistence block 320 can be configured to arbitrate operation of the mobile device in support of concurrent operation of active links with a plurality of the various communications systems. The coexistence block 320 is configured to support concurrent operation of WiMax and Bluetooth communications or WiFi and Bluetooth communications. The coexistence block 320 is not illustrated as supporting concurrent WiMax and WiFi operation, although other coexistence block 320 embodiments may support such concurrent operation. Similarly, the coexistence block 320 illustrated in FIG. 3 can support two concurrent active communication links, but other embodiments of the coexistence block 320 may support additional concurrent communication links, and may support concurrent operation of WiMax, WiFi, and Bluetooth.

The coexistence block 320 can include a WiFi arbitration block 328 that operates to arbitrate access between WiFi and Bluetooth systems. The coexistence block 320 can also include a WiMax arbitration block 322 that operates to arbitrate access between the WiMax and Bluetooth systems. The coexistence block 320 can interface with the Bluetooth module using a 3-wire interface 352 as described in IEEE 802.15.2 recommended practices. A wlan_active control line 354 of the 3-wire interface 352 can also be used to control an antenna switch (not shown) for the Bluetooth subsystem. When the signal on the wlan_active control line 354 is asserted, the Bluetooth module 340 can be inhibited from transmitting. The Bluetooth antenna switch can be opened or otherwise terminated in order to suppress Bluetooth transmission or reception.

The coexistence block 320 is not limited to supporting a 3-wire interface 352, but can be configured to support a non-standard or otherwise extended interface with the Bluetooth module 340. For example, the coexistence block 320 can be configured to support a fourth control line 356 associated with the Bluetooth module 340, where the fourth control line 356 can augment the more traditional 3-wire interface 352. The control information associated with the fourth line 352 may be reconfigurable within the coexistence block 320 in order to support different configurations corresponding to different embodiments of the Bluetooth module 340. For example, in an embodiment, the fourth line 352 may be used to support serial communications between the coexistence block 320 and Bluetooth module 340 and used, for example, to communicate the frequency band(s) being used by the WiMax modem 310 for communications, such as, for example, the frequency bands used for the uplink and downlink, respectively, in Frequency Division Duplex (FDD) WiMax operations or, for example, Long Term Evolution (LTE) operations in embodiments in which LTE is used.

The coexistence block 320 can also include a multiplexer 324 having a first input coupled to a control output from the WiFi arbitration block 328 and a second input coupled to a control output from the WiMax arbitration block 322. A modem selection signal can be coupled to the multiplexer 324 control input to select one of the WiFi control signal or the WiMax control signal depending on which of the WiFi or WiMax subsystems is engaged in active communications. Each baseband processor in the multi-mode module 302 as well as the Bluetooth module 340 can exchange signals with the coexistence block 320 in order to provide sufficient information for the coexistence block 320 to arbitrate access to the resources in the mobile device.

As previously discussed, the Bluetooth module 340 can interface with a 3-wire interface 352. The 3-wire interface 352 can include Bluetooth state (bt_state) and RF activity (rf_active) control outputs from the Bluetooth module 340 that indicate, respectively, a priority associated with a Bluetooth communication operation and activity of an RF processing path associated with the Bluetooth subsystem. The RF activity control output can be configured to envelope the actual time that the Bluetooth RF processing path is active. That is, the RF activity control output can be asserted some predetermined set-up time prior to the activation of the Bluetooth RF processing path and remains asserted at least until the Bluetooth RF processing path becomes inactive. Stated differently, the RF active signal is asserted to envelope a time that indicates antenna activity of the Bluetooth module 340. The Bluetooth module 340 can also receive the wlan_active control signal from the coexistence block 320 and can determine whether one of the WiFi or WiMax subsystems is active based on the state of the control signal on the control line.

The WiMax baseband processor 310 can exchange similar control signals with the coexistence block 320. The WiMax baseband processor 310 can interface, for example, with the WiMax arbitration module 322. For example, the WiMax baseband processor 310 can output receiver activity (wimax_rx_active) and transmitter activity (wimax_tx_active) signals and can output a priority signal (wimax_priority) as well as a priority state signal (wimax_priority_state). The receiver activity and transmitter activity signals envelope, respectively, the intervals during the downlink or uplink portions of frames in which the WiMax device is scheduled to receive or transmit. The priority signal is asserted to envelope the interval during the uplink subframe where high priority WiMax transmission takes place, or other portion of a downlink or uplink subframe having a high priority communication. Other intervals during the uplink subframe for which the signal is not asserted may be preempted, for example, to allow high priority operations of Bluetooth module 340 to take place. The priority state signal indicates that next uplink subframe that is scheduled or for which resources are allocated to carry high priority traffic, such as VoIP traffic. The WiMax baseband processor 310 can determine frames for which uplink traffic is scheduled, for example, based on a MAP message that can be included in a downlink portion of a frame. The MAP message is typically associated with a time relevance that associates the resource allocations in the MAP message to a particular frame. The coexistence block 320 is thus instructed to protect all or a portion of the uplink subframe. If the priority state signal is not asserted, then the entire uplink subframe can be considered to be of low priority value and can be preempted if needed. The WiMax baseband processor 310 can receive a control signal from the coexistence block 320 that can be used to disable, de-energize, or otherwise make unavailable one or more portions of an WiMax RF processing path. For example, the WiMax arbitration module 322 of the coexistence block 320 can output a WiMax PA shutoff signal that is used to selectively disable a power amplifier in the WiMax transmit path.

The coexistence block 320 can receive a timing signal that indicates timing of one or more wireless subsystems external to the multi-mode module 302. In one embodiment, the timing signal can be synchronized to or otherwise indicate a slot timing of the Bluetooth subsystem. In another embodiment, the timing signal can indicate a frame timing synchronized to some other module or subsystem, (not shown). In the embodiment illustrated in FIG. 3, the external timing signal is coupled to the WiMax arbitration module 322, but may also be coupled to the WiFi arbitration module 328. The coexistence block 320 may also receive a control signal that indicates whether the Bluetooth module and associated Bluetooth device are operating as a Bluetooth master device or a Bluetooth slave device. Such information can be useful in determining whether a Bluetooth operation may be rescheduled or if Bluetooth timing can be altered, reset, or otherwise modified by the Bluetooth module 340.

The coexistence block 320 can determine which, if any, of the modules is active based on the state of the control signals. The coexistence block 320 can thus arbitrate access to the relevant subsystem if one module requests access or otherwise indicates activity while another module is currently active. The coexistence block 320 can also selectively suppress activity, such as when the coexistence block 320 decouples the Bluetooth antenna from the remainder of the Bluetooth RF processing path to suppress Bluetooth reception.

Figure 4:
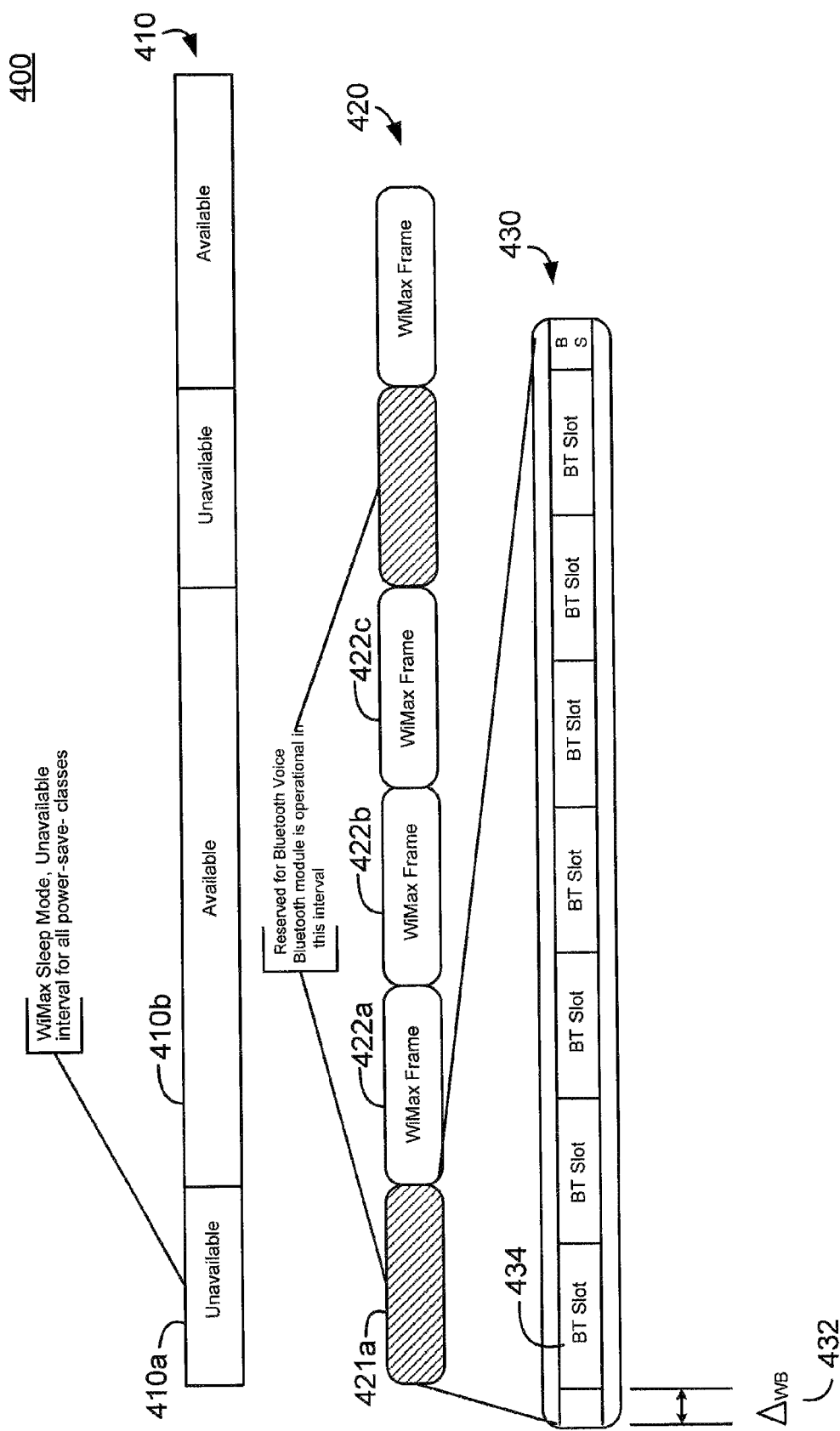
FIG. 4 is a simplified timing diagram of an embodiment of time multiplexing WiMax and Bluetooth communications.

FIG. 4 is a simplified timing diagram 400 of an embodiment of time multiplexing WiMax and Bluetooth communications. In the timing diagram 400 of FIG. 4, the WiMax system is designated as a primary communication system, and the WiMax system timing is used to establish the available time periods for Bluetooth communications.

The wireless device is configured to sleep for predetermined periods of time within the WiMax system. During the periods of time in which the WiMax device is sleeping or otherwise unavailable, the wireless device may schedule and enable communications over one or more distinct wireless systems.

The wireless device may be configured to negotiate a PSC mode with a serving base station in the WiMax system. The WiMax device or WiMax subsystem can be configured to negotiate a PSC mode having scheduled periods of inactivity. The timing associated with a PSC mode 410 can include scheduled periods of inactivity 410a followed by scheduled periods of activity 410b.

In PSC modes, the WiMax device is unavailable for predetermined periods of time corresponding to the scheduled periods of inactivity. In the embodiment illustrated in FIG. 4, the WiMax PSC mode permits periodic sleep modes. Thus, the scheduled periods of activity and inactivity from the PSC mode can map to specific frames in WiMax system timing 420. As shown in the embodiment, the WiMax device is permitted to sleep or is otherwise unavailable to the WiMax system for one frame 421a out of each four frames. The WiMax device or WiMax subsystem in a multi-mode device, can be active during the remaining three frames 422a, 422b, and 422c. In the sleep mode, the WiMax device may be idle and may sleep or otherwise perform functions unrelated to the WiMax system. During the active or available interval 410b, the WiMax device may be allocated downlink resources or uplink resources, but is not guaranteed to have any particular resource allocation.

In other embodiments, the interval of unavailability may be more than one frame duration in length, and an unavailability duration of one frame length is illustrated for purposes of discussion. Additionally, the WiMax device may negotiate multiple concurrent PSC modes in order to achieve a net unavailability interval of the desired length.

The wireless device can advantageously schedule or otherwise enable Bluetooth communications during the WiMax frames that it is scheduled to sleep or otherwise be unavailable. The wireless device can, for example, track the Bluetooth system timing 430 and can enable communications in one or more slots, e.g. 434 that follow the WiMax transition to the sleep interval 421a.

The Bluetooth system timing is likely not synchronized to the timing of the WiMax system. Thus, the wireless device may not be able to initiate Bluetooth communications immediately upon entry into WiMax sleep due to the timing offsets between the two systems.

The wireless device may refrain from scheduling or enabling Bluetooth communications during a guard period 432 that occurs upon transition to the WiMax sleep frame. The guard period 432 may be used to permit the wireless device to deactivate the WiMax subsystem and configure the Bluetooth subsystem. The duration of the guard period 432 may be less than one Bluetooth slot duration or may be one or more slot durations. Alternatively, at least a portion of the guard period 432 may occur as a byproduct of the lack of fine time synchronization between the WiMax and Bluetooth system time references.

In the presently described embodiment, the wireless device permits coexistence by using a PSC mode in the WiMax system and enabling communications to one or more other wireless systems during the scheduled deactivated or sleep frames of the PSC mode. The wireless device is thus able to time multiplex the communications between multiple systems without interfering with the communications in the various systems and without requiring modifications to any system standard or coordination of the additional communications with another communication device.

However, the wireless device need not be limited to scheduling communications systems distinct from the WiMax system during the scheduled periods of inactivity that result from negotiating a PSC mode. For example, a coexistence block within the wireless device may merely monitor the various states of the control signals from the various subsystems, and can make arbitration and access decisions based on the states. The control signals need not be synchronized to any particular system time, and may in fact transition asynchronously relative to the timing for one or more of the multiple communication systems supported by the wireless device.

Figure 5:
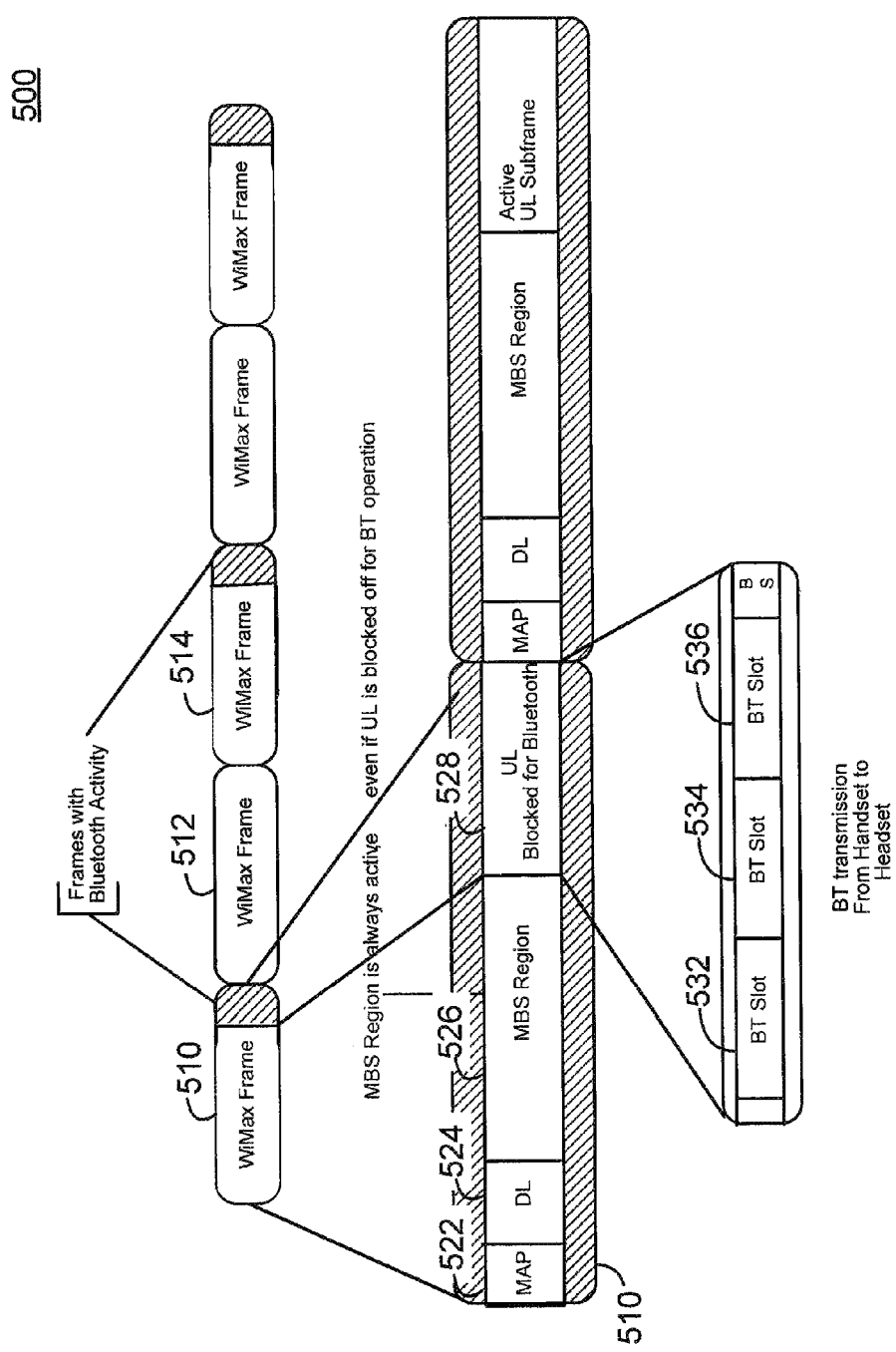
FIG. 5 is a simplified timing diagram of an embodiment of time multiplexing WiMax and Bluetooth communications.

An example of asynchronous activity and coexistence is illustrated in FIG. 5. FIG. 5 is a simplified timing diagram 500 of an embodiment of time multiplexing WiMax and Bluetooth communications. The timing diagram 500 of FIG. 5 does not illustrate PSC mode timing, but may operate in conjunction with PSC mode timing or exclusive of PSC mode timing. The WiMax system again is designated the primary communication system, and the resource allocations and access of the WiMax system is used to make decisions regarding communications over one or more distinct wireless systems.

The timing diagram 500 of FIG. 5 does not require the WiMax subsystem of the wireless device to negotiate a PSC mode. Thus, the wireless device does not need to have the ability to communicate with the serving base station. This may be particularly advantageous, for example, where the wireless device is configured to receive broadcast data, such as content broadcast in a macro-diversity region of the downlink frames.

In the timing diagram 500 embodiment of FIG. 5, the wireless device determines which frames 510 and 514 have no uplink resource allocations for the WiMax device. The wireless device does not attempt to schedule Bluetooth operation during the uplink subframe portion of a frame 512 in which uplink resources are allocated to the WiMax subsystem. The wireless device can selectively schedule communications over one or more distinct wireless systems during an UL portion of frames having no allocation for the wireless device, e.g. 510 and 514. The wireless device does not transmit over the WiMax system during frames for which it has no UL allocation and thus is not active during those non-allocated portions of a frame.

In the embodiment illustrated in FIG. 5, the wireless device is configured to enable the Bluetooth communications during the UL portion of a WiMax frame having no uplink resource allocations 510. Such frames may occur every other WiMax frame in some instances or may occur more frequently or less frequently in other applications. In an example, the wireless device may be configured to tune to a content channel in the macro-diversity region 526 of the WiMax downlink frames and may utilize a Bluetooth headset to listen to stereo audio broadcast accompanying the content channel.

The wireless device can determine that it has relatively little or no information to transmit in the WiMax system, and thus can determine that relatively few WiMax UL resources will be allocated to it. The wireless device can configure the UL portion of every other WiMax frame to support transmission of the Bluetooth stereo audio to the headset.

The coexistence block enables access based on the activity states of the various wireless subsystems. However, the coexistence block also takes priority level into consideration when enabling access. As an example, Bluetooth operations of high priority are able to preempt WiMax operations of equal or lower priority. The priority levels can be fixed or the coexistence block can adaptively determine a relative value of priority of each transaction and can make access or arbitration decisions based on the relative values of priority. For example, the coexistence block can increase a relative priority level based on an intrinsic priority level associated with the transaction type and one or more previous suppression of communication of a related transaction type, where a related transaction type may refer to a communication from the same communication subsystem.

A WiMax frame 510 can include, for example, a MAP portion 522 that includes the resource allocation for the present or a future frame, a downlink portion or subframe 524 during which downlink traffic may be transmitted to the wireless device, a MBS or macro-diversity region 526 during which broadcast information may be transmitted, and an uplink portion or subframe 528 during which the wireless device may transmit uplink signals. In the example shown in FIG. 5, the frame having no uplink resource allocations 510 can utilize the uplink subframe 528 for communicating Bluetooth data.

The wireless device may enable transmission or reception in one or more Bluetooth slots 532, 534, and 536 that occur during the period of inactivity in the WiMax system. The start of the Bluetooth slots may not coincide with the transition of the WiMax subsystem to the uplink subframe for a variety of reasons. For example, there may be a delay due to the lack of time synchronization between the two subsystems. There may also be a delay due to the envelope timing associated with one or more control signals that indicate activity in the WiMax subsystem.

Figure 6:
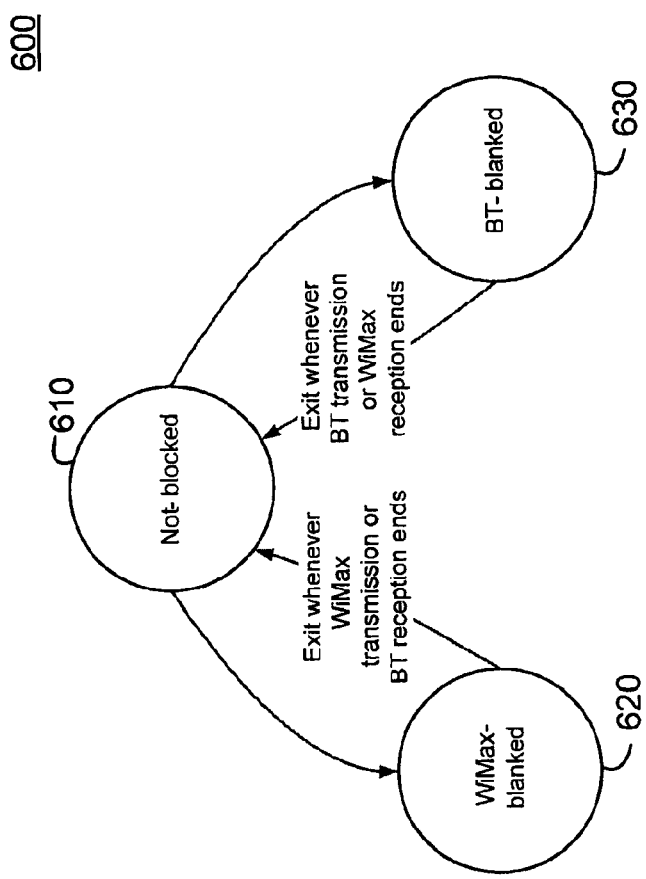
FIG. 6 is a simplified state diagram of WiMax and Bluetooth coexistence.

FIG. 6 is a simplified state diagram 600 that illustrates the states in WiMax-Bluetooth coexistence. A state machine may implement, for example, the state diagram within the WiMax arbitration processor of the coexistence block of FIG. 3.

The state diagram 600 includes several states. A default state can be, for example, a not-blocked state 610, in which the coexistence block permits unrestricted access to the subsystem portions in the multi-mode wireless device. The coexistence block may remain in the not-blocked state 6120 when the wireless device is communicating with only one communications system or if the wireless device is engaged in communications with multiple communication systems but only one subsystem is presently active and utilizing resources of the wireless device.

The coexistence block may transition to the WiMax blanked state 620 if the Bluetooth subsystem is active. Alternatively, the coexistence block may transition to the WiMax blanked state 620 when the WiMax subsystem is active if the coexistence block receives an indication of Bluetooth activity of higher priority. The coexistence block can transition back to the not-blocked state 610 whenever a Bluetooth transmission ends or a WiMax reception ends. In the blanked state, the WiMax transmitter is de-energized or otherwise made unavailable.

Similarly, the coexistence block may transition from the not-blanked state 610 to the Bluetooth blanked state 630 during periods in which the WiMax transmitter is active or the Bluetooth subsystem is configured for reception. In the blanked state, the Bluetooth transmitter is de-energized or otherwise made unavailable. The coexistence block can transition back to the not-blocked state 610 whenever a WiMax transmission ends or a Bluetooth reception ends.

The coexistence block may utilize each of the control inputs supplied by the communication subsystems when making the state transition decisions, and is not limited to those transitions described above. For example, the coexistence block may take into account WiMax activity, WiMax priority levels, Bluetooth activity, and Bluetooth priority levels when making state transition decisions.

Figure 7:
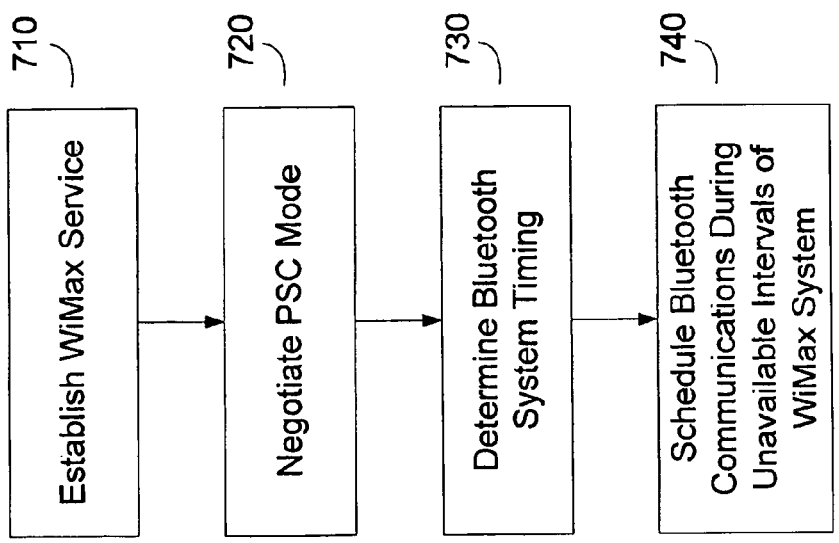
FIG. 7 is a simplified flowchart of an embodiment of a method of configuring a mobile device for coexistence of multiple communication links of multiple communication systems.

FIG. 7 is a simplified flowchart of an embodiment of a method 700 of configuring a mobile device for coexistence of multiple communication links of multiple communication systems. The method 700 can be executed, for example, by the multiple mode wireless device of FIG. 2 operating in the wireless environment of FIG. 1. The method 700 is described with the WiMax system designated as the primary communication system. However, the method 700 is not limited to such a designation.

The method 700 begins at block 710 where the wireless device initially establishes service with the WiMax system. The wireless device may establish virtually any type of communications supported by the WiMax system. For example, the wireless device may negotiate a communication link to support Voice over IP (VOIP) communications.

After establishing the initial service in the WiMax system, the wireless device proceeds to block 720 and negotiates a PSC mode with the WiMax system via the serving base station. The wireless device can, for example, reset all previously negotiated PSC modes, determine a duty cycle for the new PSC mode assignment, and determine a start time for the newly negotiated PSC mode.

The wireless device proceeds to block 730 and determines Bluetooth system timing. The wireless device can, for example, be either a master or slave device in the Bluetooth communication link. The wireless device can establish the Bluetooth timing if it is the Bluetooth master device or may determine the timing from the master if the wireless device is a Bluetooth slave device.

The wireless device proceeds to block 740 and schedules the Bluetooth communications during the unavailable intervals of the WiMax system, as determined from the PSC mode. Because the two communication systems are likely not synchronized, the wireless device may utilize a guard period after the start of each unavailable time to ensure that the WiMax and Bluetooth communications do not interfere with one another.

Figure 8A:
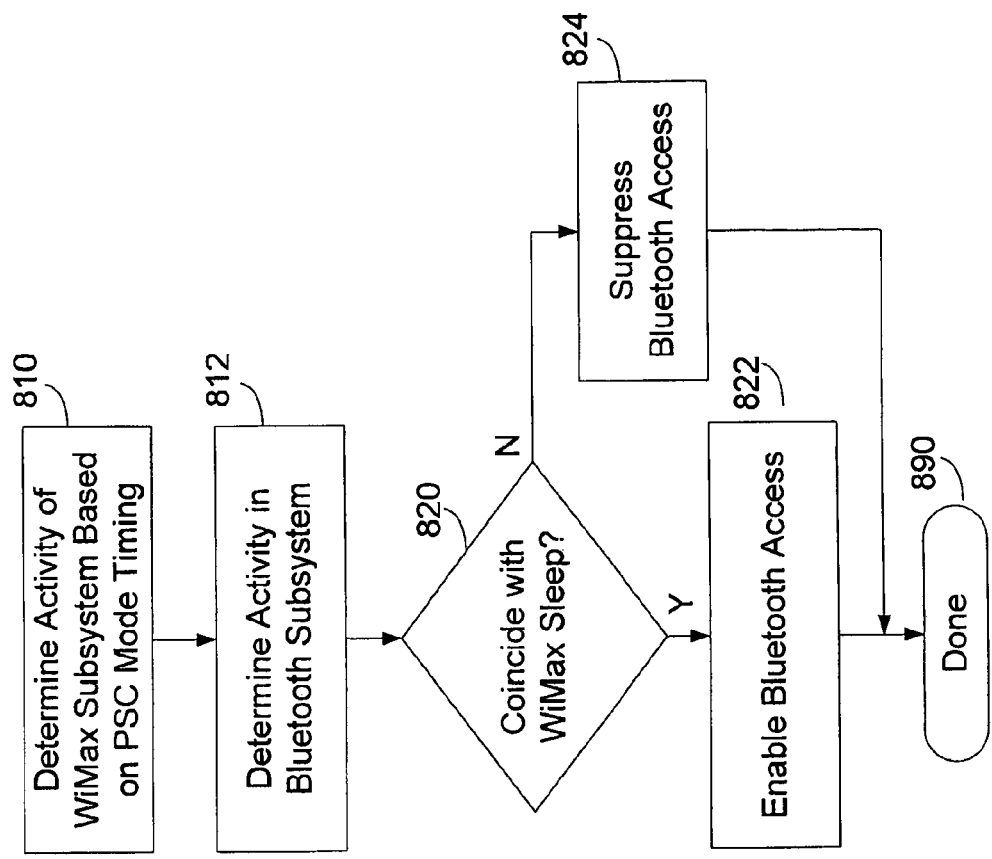
FIGS. 8A-8B are simplified flowcharts of embodiments of methods of determining WiMax unavailability and scheduling of Bluetooth communications.

FIG. 8A is one embodiment of a method 740 of scheduling the Bluetooth communications subsystem during unavailable or otherwise inactive intervals of the WiMax subsystem. The method 740 can be part of the overall device configuration method of FIG. 7, and can be performed, for example, by the coexistence block.

The method 740 begins at block 810 where the coexistence block determines activity of the WiMax subsystem based at least in part on the PSC mode timing. A wireless device with a negotiated PSC mode is configured for dynamically reconfigurable scheduled periods of inactivity. However, the scheduled periods of inactivity is known or can be determined based on the negotiated PSC mode and WiMax subsystem timing.

The coexistence block proceeds to block 812 and determines activity or an indication of activity in the Bluetooth subsystem. The coexistence block proceeds to decision block 820 and determines if the Bluetooth activity coincides with the WiMax sleep periods, which are the scheduled periods of inactivity.

If so, the coexistence block proceeds to block 822 and enables or otherwise permits Bluetooth subsystem access. The coexistence block permits the Bluetooth subsystem to complete its activity. The coexistence block has completed the arbitration of the event and can proceed to block 890 where it is done.

If, at decision block 820, the coexistence block instead determines that the WiMax subsystem is not in a sleep mode, the coexistence block proceeds from decision block 820 to block 824 and suppresses Bluetooth subsystem access. The coexistence block may, for example, control a 3-wire interface to indicate to a Bluetooth baseband processor that access is denied. The coexistence block may also inhibit or suppress the Bluetooth transmitter and a Bluetooth receive path. The coexistence block may blank the Bluetooth transmitter, for example, by deactivating or de-energizing a transmit power amplifier in the Bluetooth subsystem. The coexistence block may suppress Bluetooth reception by decoupling a Bluetooth antenna. The coexistence block proceeds from block 824 to block 890 and is done.

Figure 8B:
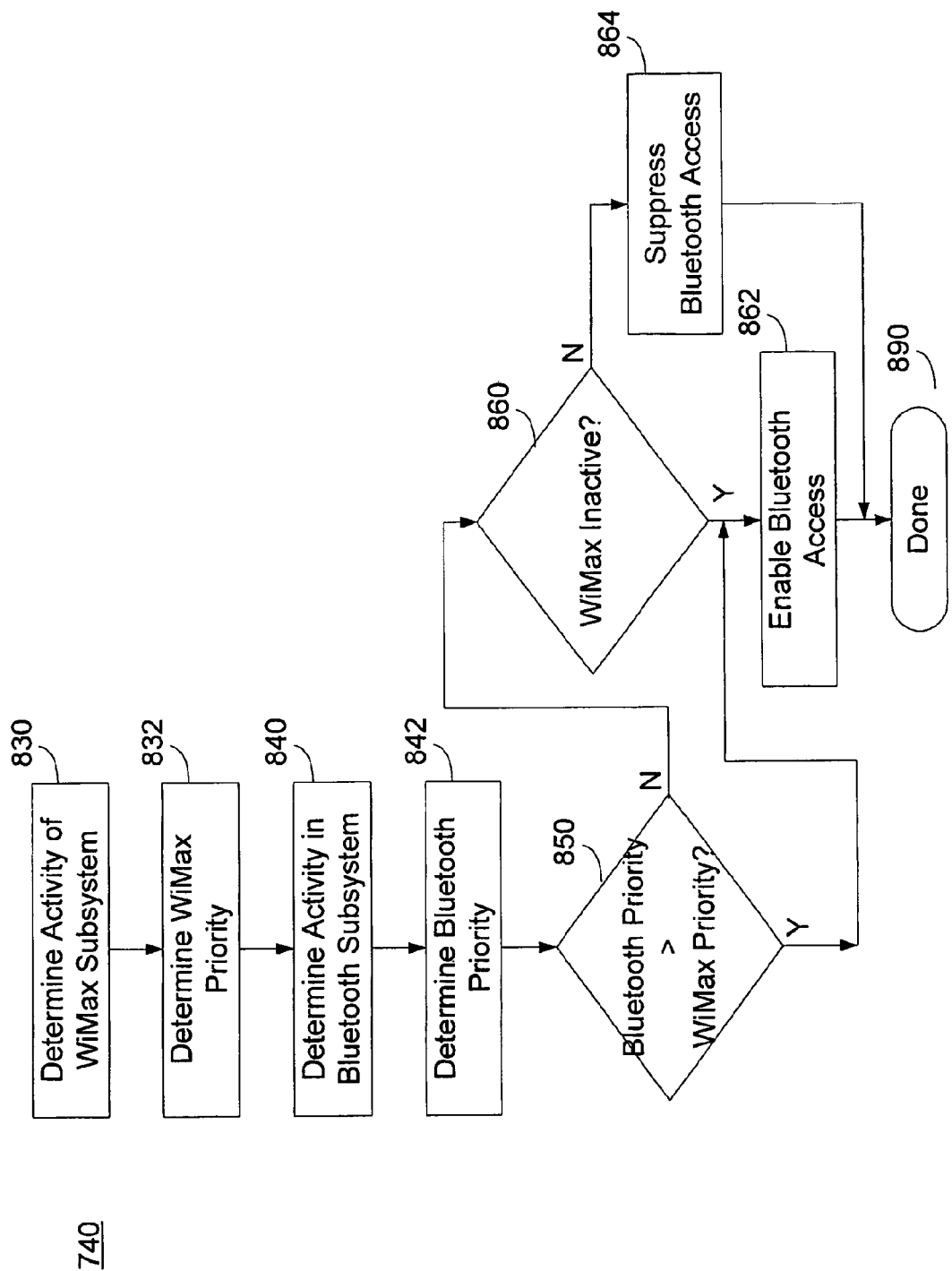

FIG. 8B is an alternative embodiment of a method 740 of scheduling the Bluetooth communications subsystem during unavailable or otherwise inactive intervals of the WiMax subsystem. The method 740 can be part of the overall device configuration method of FIG. 7, and can be performed, for example, by the coexistence block. Although the method of FIG. 8B is described in the context of part of the method of FIG. 7, the method of FIG. 8B may have applicability in other methods, and may be applicable in coexistence methods not based on PSC mode or scheduled periods of inactivity.

The method 740 of FIG. 8B includes the ability of the coexistence block to take priority levels into account when enabling subsystem access. Each Bluetooth or WiMax transaction (transmit or receive activity) has an intrinsic priority level, relative to other activities for the same link. The coexistence block may adaptively modify the relative priority values based on channel access attempts or some other parameter or combination of parameters.

For example, transmission and reception of certain WiMax frames or sub-regions within a WiMax frame have higher intrinsic priority relative to other frames or regions within the same WiMax frame. An example of a portion having a higher intrinsic priority relative to other portions of the same frame is the preamble/MAP region of the Downlink subframe for the WiMax system. The intrinsic priority value assigned these transactions reflect the difference in priority.

This intrinsic priority level is communicated to the coexistence block for each wireless link transaction. The coexistence block keeps track of recent history of channel access for each link. The coexistence block takes into account the history of attempted and successful channel access as well as the intrinsic priority value of the current tasks vying for channel access and arrives at ranked (relative) priorities for all the pending transactions. As an example, the coexistence block may elevate the relative priority of a particular transaction if that transaction is denied access one or more times. The relative priority may increase to a level that virtually ensures that the transaction will be provided access. The coexistence block can permit the transaction with the highest relative priority value access to the channel.

The concept of channel access (packet preemption) based on priority, and a frame work for assigning time-varying priority levels to transmission/reception transactions on link wireless link are implemented in the asynchronous preemption logic described herein.

The method 740 begins at block 830 where the coexistence block determines activity or indication of an activity state of the WiMax subsystem, which may be configured as a primary communication system in a wireless device.

The coexistence block proceeds to block 832 and determines an associated priority of the WiMax activity. The priority may be determined, for example, based on a state of one or more priority signals provided to the coexistence block.

The coexistence block proceeds to block 840 and determines an activity, activity state, or indication of activity of a Bluetooth subsystem. The coexistence block proceeds to block 842 and determines an associated Bluetooth priority.

The coexistence block proceeds to decision block 850 and determines if the Bluetooth priority exceeds the WiMax priority. If so, any WiMax activity can be terminated in favor of the higher priority Bluetooth activity. The coexistence block proceeds to block 862 and enables Bluetooth subsystem access.

If the coexistence block determines at decision block 850 that the Bluetooth priority does not exceed WiMax priority, the coexistence block proceeds to decision block 860. The coexistence block determines if the WiMax subsystem is no longer active. The WiMax subsystem may be inactive, even if it is currently in an active communication link, if the WiMax subsystem is sleeping or if the WiMax subsystem currently has not downlink resource allocation or no uplink resource allocation, and it is not presently processing downlink messages, such as MAP messages.

If the WiMax subsystem is inactive, the coexistence block proceeds to block 862 and enables Bluetooth access. If, at block 860, the coexistence block determines that the WiMax subsystem is active, then the coexistence block proceeds to block 864 to suppress Bluetooth access. The coexistence block proceeds from both blocks 862 and 864 to block 890, where it is done arbitrating the present activity.

Methods and apparatus are described herein for coexistence of multiple communications by time multiplexing the multiple communications.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of operating a communication device, the method comprising:
   establishing a first communication link in a first band, the first communication link comprising an uplink portion of a frame;
   establishing a second communication link in a second band;
   determining a portion of time during which the uplink portion of the frame has no resource allocations;
   scheduling a period for transmission during the portion of time in which the uplink portion of the frame has no resource allocations; and
   transmitting a second communication over the second communication link during the period for transmission, wherein the second communication is scheduled to occur during the portion of time in which the uplink portion of the frame has no resource allocations and outside of a guard period of the portion of time in which the uplink portion of the frame has no resource allocations.

2. The method of claim 1 wherein the frame is an OFDMA frame.

3. The method of claim 1 wherein the determining is based on a MAP portion of the frame.

4. The method of claim 1 wherein the determining is based on a MAP portion of a second frame.

5. The method of claim 1 wherein the first communication link comprises Multicast and Broadcast Service (MBS) data in a downlink portion of the frame.

6. The method of claim 1 further comprising:
   initiating a communication activity over the first communication link, the communication activity comprising a first intrinsic priority level;
   providing a second intrinsic priority level relating to the second communication;
   comparing the first intrinsic priority level to the second intrinsic priority level prior to determining the portion of time during which the uplink portion of the frame has no resource allocations; and
   suppressing the second communication if the first intrinsic priority level exceeds the second intrinsic priority level.

7. A method of operating a communication device, the method comprising:
   establishing a first communication link in a first band;
   establishing a second communication link in a second band;
   initiating a first communication activity over the first communication link, the first communication activity comprising a first priority level and further comprising an uplink portion of a frame;
   providing a second communication activity for transmission over the second communication link, the second communication activity comprising a second priority level;
   comparing the first priority level to the second priority level; and
   based on the comparing:
      if the first priority level exceeds the second priority level:
         suppressing the second communication activity; and
      if the first priority level does not exceed the second priority level:
         determining a portion of time during which the uplink portion of the frame has no resource allocations;
         scheduling a period for transmission during the portion of time in which the uplink portion of the frame has no resource allocations; and
         transmitting the second communication activity over the second communication link during the period for transmission.

* * * * *